United States Patent
Watase

(10) Patent No.: US 8,321,159 B2
(45) Date of Patent: Nov. 27, 2012

(54) CONTROLLER FOR REMAINING LIQUID AMOUNT METER, REMAINING LIQUID AMOUNT METER, AND VEHICLE

(75) Inventor: Shingo Watase, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 811 days.

(21) Appl. No.: 12/399,969

(22) Filed: Mar. 8, 2009

(65) Prior Publication Data

US 2009/0240447 A1    Sep. 24, 2009

(30) Foreign Application Priority Data

Mar. 12, 2008  (JP) ................................ 2008-062569

(51) Int. Cl.
*G01F 23/00* (2006.01)

(52) U.S. Cl. ............. 702/55; 702/50; 702/100; 702/166

(58) Field of Classification Search ............ 702/50, 702/55, 100, 166
See application file for complete search history.

(56) References Cited

U.S. PATENT DOCUMENTS

| | | | | |
|---|---|---|---|---|
| 4,890,491 A | * | 1/1990 | Vetter et al. | 73/290 R |
| 5,257,300 A | * | 10/1993 | Bennett et al. | 377/21 |
| 2001/0032506 A1 | * | 10/2001 | Keller | 73/313 |

FOREIGN PATENT DOCUMENTS

| | | |
|---|---|---|
| JP | H111999-218434 A | 8/1999 |
| JP | 0003909618 B | 2/2007 |

* cited by examiner

Primary Examiner — Mohamed Charioui
Assistant Examiner — Paul D Lee
(74) Attorney, Agent, or Firm — Keating & Bennett, LLP

(57) ABSTRACT

According to some embodiments, a controller 100 of this remaining liquid amount meter 200 performs cumulative processing that increases a cumulative value T when a display level (Rm1) specified based on the liquid surface level detected by a first detection section 141 is higher than a display level (Rm) displayed by the remaining liquid amount meter 200, and that decreases the cumulative value (T) when the display level (Rm1) is lower than the display level (Rm) (S9 to S15). Then, when the cumulative value (T) becomes larger than a predetermined threshold value (Tc), the controller 100 performs display processing that changes the display level (Rm) displayed by the remaining liquid amount meter 200 (S16 to S19).

14 Claims, 5 Drawing Sheets

CONTROLLER FOR REMAINING LIQUID AMOUNT METER, REMAINING LIQUID AMOUNT METER, AND VEHICLE

This application claims priority under 35 U.S.C. §119 to Japanese Patent Application No. 2008-062569 filed on Mar. 12, 2008, the entire disclosure of which is incorporated herein by reference in its entirety.

BACKGROUND

1. Field of the Invention

The preferred embodiments of the present invention relate, inter alia, to a controller for a remaining liquid amount meter for displaying the remaining amount of liquid in a tank of a vehicle.

2. Description of the Related Art

The following description sets forth the inventor's knowledge of related art and problems therein and should not be construed as an admission of knowledge in the prior art.

In a remaining liquid amount meter for displaying a remaining amount of liquid in a tank of a vehicle, it is generally configured to detect, for example, the liquid surface level in the tank to display the remaining amount of the liquid. The remaining liquid amount meter of this kind is used as a meter for indicating the remaining amount of fuel. In a two-wheeled vehicle configured to be parked using a side stand, the vehicle is raised upright with the side stand folded at the time of starting the vehicle. The liquid level of the fuel in the storage tank changes between the state in which the vehicle is parked using the side stand and the state in which the vehicle is stood upright. In a two-wheeled vehicle, changes of the liquid surface level of the fuel in the storage tank are also caused by the inclination of the vehicle to the right or left at the time of turning as well as the vibration of the vehicle at the time of traveling on an unpaved road. Such fluctuations of the liquid surface of the fuel in the storage tank may change the liquid surface level to be detected, which in turn results in fluctuations of the remaining liquid amount displayed by the remaining liquid amount meter.

A meter for displaying the remaining amount of fuel in a two-wheeled vehicle is disclosed in Japanese Patent No. 3909618. In this patent, the data update time is changed based on the vehicle speed determination result. When the vehicle speed is low, the data update time is shortened and the liquid surface is detected within a time shorter than the data update time. At the end of the data update time, the remaining fuel amount is displayed based on the detected value. According to the aforementioned patent, the accurate remaining fuel amount can be displayed in a short time after raising the vehicle upright, which in turn results in a remaining liquid amount meter for a vehicle with less display delay. Moreover, the update data time is set to long during the running of the vehicle. Therefore, even if the fuel is waved while the vehicle is running, it is possible to prevent occurring of deteriorated visibility due to flickering of the display of the remaining liquid amount meter.

According to the remaining liquid amount meter disclosed in the aforementioned Japanese patent No. 3909618, the display is updated at specified updating time intervals. Thus, it is considered that even in cases where the liquid surface is waving, by increasing the number of displays, an average value can be displayed and that the display of the remaining amount of fuel is not changed excessively. However, since the display of the remaining amount of fuel is updated simply at specified updating time intervals, the display to be updated depends on the detected value at a certain updating time. This may cause incorrect displaying of the remaining amount of fuel depending on the update timing. As a meter for displaying the remaining amount of fuel of a vehicle, it is preferable to display the remaining amount of fuel as correctly as possible while restraining the display flickering of the remaining liquid amount meter.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a controller for a remaining liquid amount meter configured to display a remaining amount of liquid in a tank of a vehicle, the controller being capable of controlling the remaining liquid amount meter so as to display the remaining amount of fuel in a tank as correctly as possible while restraining the display flickering of the remaining liquid amount meter.

Among other potential advantages, some embodiments can provide a remaining liquid amount meter capable of displaying a remaining amount of fuel in a tank as correctly as possible while restraining the display flickering of the remaining liquid amount meter.

Among other potential advantages, some embodiments can provide a vehicle equipped with the remaining liquid amount meter capable of displaying a remaining amount of fuel in a tank as correctly as possible while restraining display flickering of the remaining liquid amount meter.

According to a first aspect of the present invention, in a controller for a remaining liquid amount meter configured to display a remaining amount of liquid in a tank of a vehicle, the controller includes a detection section for detecting a liquid surface level in the tank, and a storage section for storing a plurality of display levels indicating the remaining amount of liquid in the tank of the vehicle and a cumulative value. The controller is configured to perform:

(1) cumulative processing for increasing or decreasing the cumulative value when a display level (Rm1) specified based on the liquid surface level detected by the detection section is higher than a display level (Rm) currently displayed by the remaining liquid amount meter and for decreasing or increasing the cumulative value when the display level (Rm1) is lower than the display level (Rm); and (2) display processing for changing the display level (Rm) when the cumulative value exceeds a predetermined threshold value.

According to this controller for a remaining liquid amount meter, in the processing for changing the display of the remaining liquid amount meter by the cumulative processing and the display processing, the cumulative value is used and when the value detected by the detection section has been continuously changed for a certain period of time, the display of the remaining liquid amount meter is changed. This prevents display flickering of the remaining liquid amount meter, resulting in accurate displaying of the remaining amount of liquid.

According to a second aspect of the present invention, in a controller for a remaining liquid amount meter configured to display a remaining amount of liquid in a tank of a vehicle, the controller includes:

a first storage section for storing a plurality of display levels stepwisely indicating the remaining amount of liquid in the tank of the vehicle;

a second storage section for storing one display level (Rm) to be displayed by the remaining liquid amount meter among the plurality of display levels;

a third storage section for storing a cumulative value;

a fourth storage section for storing a threshold value for determining timing of updating the display level (Rm) stored in the second storage section;

a first detection section for detecting a liquid surface level in the tank;

a first processing section for specifying one display level (Rm1) from among the plurality of display levels stored in the first storage section based on the liquid surface level detected by the first detection section;

a second processing section for decreasing the cumulative value stored in the third storage section when the display level (Rm1) specified by the first processing section is smaller than the display level (Rm) stored in the second storage section;

a third processing section for increasing the cumulative value stored in the second storage section when the display level (Rm1) specified by the first processing section is larger than the display level (Rm) stored in the second storage section;

a fourth processing section for decreasing the display level (Rm) stored in the second storage section when the cumulative value stored in the third storage section becomes smaller than the threshold value stored in the fourth storage section;

a fifth processing section for increasing the display level (Rm) stored in the second storage section when the cumulative value stored in the third storage section becomes larger than the threshold value stored in the fourth storage section; and a sixth processing section for setting the cumulative value stored in the third storage section to a predetermined initial value after the processing of the fourth processing section and the fifth processing section.

According to a third aspect of the present invention, a remaining liquid amount meter is controlled by any one of the aforementioned controllers.

According to a fourth aspect of the present invention, a vehicle is equipped with any one of the remaining liquid amount meters.

According to a fifth aspect of the present invention, a method for controlling a remaining liquid amount meter is configured to display a remaining amount of liquid in a tank of a vehicle. The method includes the steps of:

determining a plurality of display levels indicating the remaining amount of liquid in the tank of the vehicle;

determining a first display level (Rm) to be displayed by the remaining liquid amount meter among the plurality of display levels;

determining a cumulative value;

storing a threshold value for determining timing of updating the first display level (Rm);

detecting a liquid surface level in the tank;

specifying a second display level (Rm1) from the plurality of display levels based on the liquid surface level detected by the detecting step;

decreasing the cumulative value when the second display level (Rm1) is less than the first display level (Rm);

increasing the cumulative value when the second display level (Rm1) is greater than the first display level (Rm);

decreasing the first display level (Rm) when the cumulative value is less than the threshold value;

increasing the first display level (Rm) when the cumulative value is greater than the threshold value; and setting the cumulative value to a predetermined initial value after the processing result of the second decreasing step or the second increasing step.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, a controller for a remaining liquid amount meter according to one embodiment of the present invention will be described.

Figure 1:
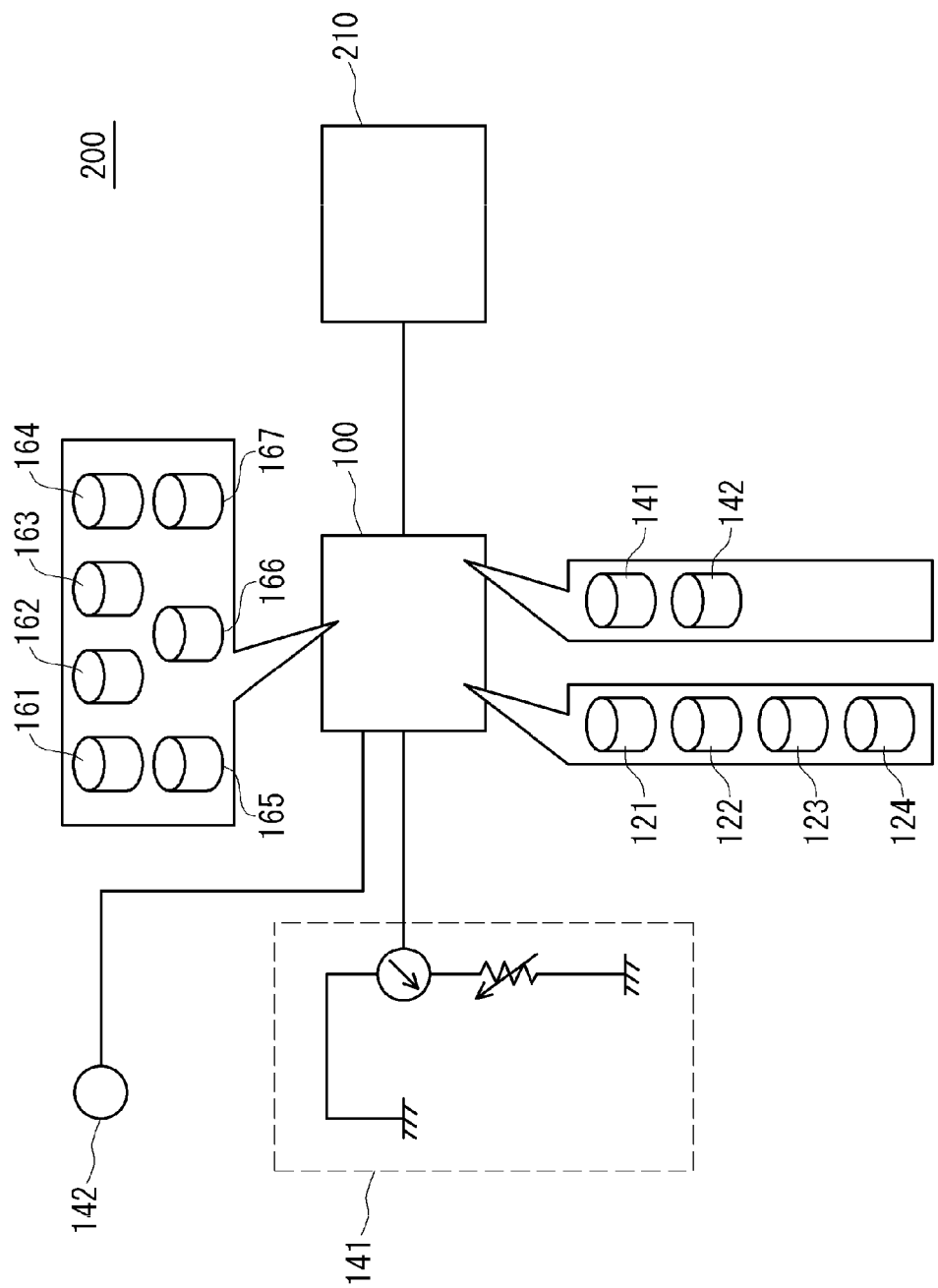
FIG. 1 is a diagram showing a system construction of a controller for a remaining liquid amount meter according to an embodiment of the invention.

In this embodiment, the remaining liquid amount meter 200 is used as a meter for indicating the remaining amount of liquid in a tank of a vehicle. This remaining liquid amount meter 200 is suitably used as a meter for indicating the remaining amount of fuel in a two-wheeled vehicle configured to be parked using a side stand. As shown in FIG. 1, this remaining liquid amount meter 200 is provided with a controller 100 for controlling the display of a display portion 210. Although not shown in FIG. 1, the controller 100 is provided with a computation section including, e.g., a CPU, and a storage section including, e.g., a non-volatile memory and performs various electronic computation processing to control the remaining liquid amount meter 200 in accordance with a predetermined program.

As shown in FIG. 1, the controller 100 includes storage sections 121 to 124 for storing specified information respectively, detection sections 141 and 142 for detecting specified information respectively, and processing sections 161 to 167 for performing specified processing respectively.

Figure 2:
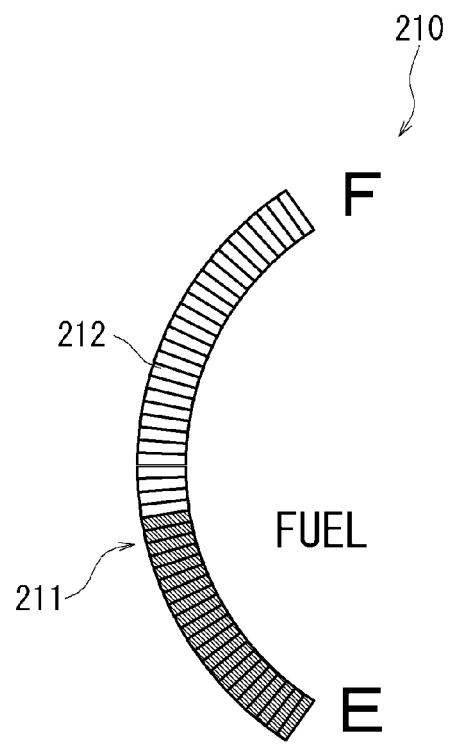
FIG. 2 is a diagram showing a display portion of the remaining liquid amount meter according to the embodiment of the invention.

The first storage section 121 stores a plurality of display levels stepwisely indicating the remaining amount of liquid in a tank. In this embodiment, as shown in FIG. 2, the display portion 210 of the remaining liquid amount meter 200 is formed by a liquid crystal indicator. This indicator has a display panel 211 including a plurality of liquid crystal bars 212 arranged from "F" (indicating "full tank") to "E" (indicating "empty tank") along a circular arc, so that the amount corresponding to the remaining amount of liquid in the tank is indicated by lighting the liquid crystal bars 212. In this display panel 211, for example, 50 discrete liquid crystal bars 212 are arranged from "F" to "E." In this case, it is preferable that the first storage section 121 stores 50 display levels stepwisely indicating the remaining amount of liquid in the tank. In this embodiment, although the stepwise evaluation is performed at 50 levels, the number of evaluation levels can be set arbitrarily.

The second storage section 122 stores one display level Rm to be displayed by the remaining liquid amount meter 200 among the plurality of display levels. That is, the second storage section 122 stores a display level to be displayed by the remaining liquid amount meter 200, and the controller 100 controls the remaining liquid amount meter 200 such that the remaining liquid amount meter 200 displays the remaining amount of liquid in the tank corresponding to the display level stored in the second storage section 122.

The third storage section 123 stores a cumulative value T. The cumulative value T is used for measuring the timing of updating the display level Rm.

The fourth storage section 124 stores a threshold value Tc for determining the timing of updating the display level Rm stored in the second storage section 122. The threshold value Tc is a value for specifying the timing of updating the display level Rm with respect to the cumulative value T. In this embodiment, the cumulative value T is an integer and its initial value is 0 (zero). The cumulative value T is evaluated as an absolute value as will be described later, and therefore the threshold value Tc is set as an arbitrarily selected natural number.

The first detection section 141 is configured to detect the liquid surface level in the tank. That is, in this controller 100, the first detection section 141 receives a detection signal from, e.g., a liquid level detection sensor (not shown) arranged in the tank to detect the liquid surface level in the tank. Various kinds of sensors can be used as the liquid level detection sensor. For example, the liquid level detection sensor can be a device equipped with an electric mechanism capable of being changed in electric resistance in accordance with the movements of an arm member having one end connected to a float (floating member) floated on the liquid in the tank so as to detect the liquid surface level in the tank based on the electric resistance value. In this embodiment, the first detection section 141 executes the liquid surface level detection at specified intervals (for example, every 50 ms)

The second detection section 142 is configured to detect the speed V of the vehicle. In the controller 100, the second detection section 142 receives a detection signal from a vehicle speed sensor (not shown) mounted on the vehicle to detect the vehicle speed V.

Hereinafter, the processing sections 161 to 167 will be explained with reference to the flowcharts shown in FIGS. 3 and 4.

Figure 3:
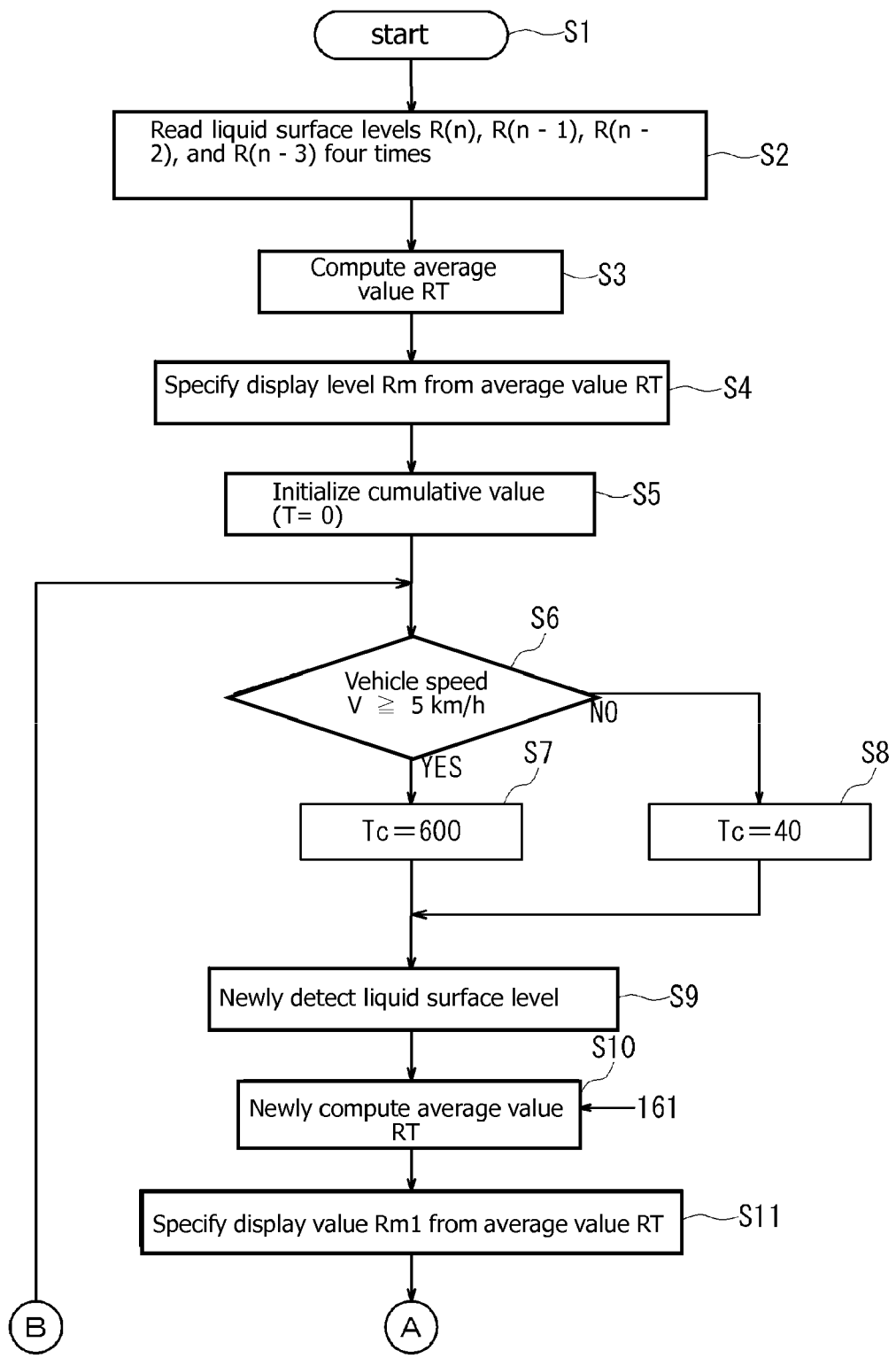
FIG. 3 is a first flowchart of the controller for the remaining liquid amount meter according to the embodiment of the invention.

The first processing section 161 specifies one display level Rm1 from the plurality of display levels stored in the first storage section 121 based on the fluid surface level detected by the first detection section 141 (Step S11 in FIG. 3). Here, from among the plurality of display levels stored in the first storage section 121, a display level suitable for displaying the remaining amount of the liquid corresponding to the liquid surface level detected by the first detection section 141 is specified.

In this regard, it can be configured such that the first processing section 161 specifies one display level Rm1, from among the plurality of display levels stored in the first storage section 121, based on an average value of the fluid surface levels obtained by plural detections by the first detection section 141 within a predetermined period of time. In this embodiment, the first detection section 141 detects the liquid surface level in the tank at specified (time) intervals. The first processing section 161 obtains an average value of detected values of the most recently detected four liquid surface levels detected by the first detection section 141. Calculating the average value allows rather correct detection of the remaining amount of liquid even in cases where the liquid level fluctuates in the tank, for example, while the vehicle is running. Furthermore, in this embodiment, to correctly detect the remaining amount of liquid, in computing the average value, the average value is computed by averaging two detected values in which the maximum value and the minimum value are excluded from four values detected by the first detection section 141. Among the plurality of display levels stored in the first storage section 121, a display level Rm1 suitable for displaying the remaining amount of liquid corresponding to the average value of the fluid surface level is specified.

Figure 4:
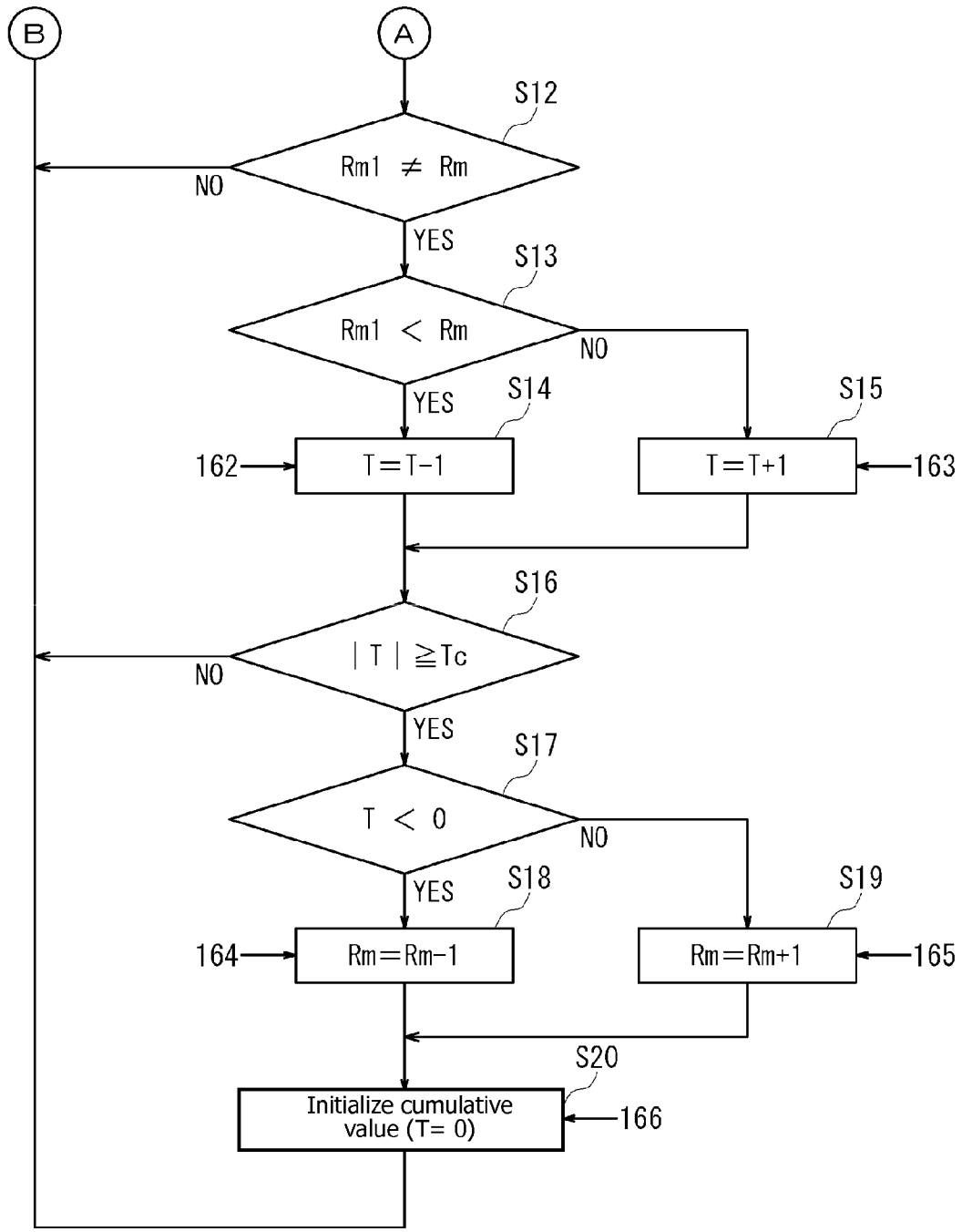
FIG. 4 is a second flowchart continued from the first flowchart shown in FIG. 3.

The second processing section 162 decreases the accumulative value T stored in the third storage section 123 when the display level Rm1 specified by the first processing section 161 is smaller than the display level Rm stored in the second storage section 122 (Step S14 in FIG. 4). That is, when the display level Rm1 specified by the first processing section 161 is smaller than the display level Rm currently displayed on the display portion 210 (in other words, when it is detected that fuel is decreased), the second processing section 162 decreases the cumulative value T. At this time, in this embodiment, the cumulative value T will be set to a value T−1 (i.e., T=T−1), that is, the cumulative value T stored in the third storage section 123 is changed into a value T−1 obtained by subtracting 1 from the current cumulative value T.

The third processing section 163 increases the cumulative value T stored in the third storage section 123 when the display level Rm1 is larger than the display level Rm, (Step S15 in FIG. 4). That is, when the display level Rm1 specified by the first processing section 161 is larger than the display level Rm currently displayed on the display portion 210 (in other words, when it is detected that fuel is increased), the third processing section 163 increases the cumulative value T. At this time, in this embodiment, the cumulative value T will be set to a value T+1 (i.e., T=T+1), that is, the cumulative value T stored in the third storage section 123 is changed into a value T+1 obtained by adding 1 to the current cumulative value T.

The fourth processing section 164 decreases the display level Rm stored in the second storage section 122 when the cumulative value T stored in the third storage section 123 becomes smaller than a threshold value Tc stored in the fourth storage section 124 (Step S18 in FIG. 4). In this embodiment, in this case, the fourth processing section 164 decreases the display level Rm currently displayed on the display portion 210 by 1.

The fifth processing section 165 increases the display level Rm when the cumulative value T becomes larger than the threshold value Tc (Step S19 in FIG. 4). In this embodiment, in this case, the fifth processing section 165 increases the display level Rm currently displayed at present on the display portion 210 by 1.

The sixth processing section 166 execute processing of setting the cumulative value T to a predetermined initial value after the processing by the fourth processing section 164 and the fifth processing section 165 (Step S20 in FIG. 4). In this embodiment, the initial value is 0 (zero), and the cumulative value T stored in the third storage section 123 is processed to 0 (T=0) by the sixth processing section 166 after the processing by the fourth processing section 164 and the fifth processing section 165. With this, the cumulative value T is returned to the initial value 0 (zero).

The seventh processing section 167 changes the threshold value Tc stored in the fourth storage section 124 in accordance with the vehicle speed V detected by the second detection section 142 (Steps S6 to S8 in FIG. 3). That is, the threshold value Tc stored in the fourth storage section 124 is changed in accordance with the vehicle speed V detected by the second detection section 142. In this embodiment, when the vehicle speed V detected by the second detection section 142 is lower than a predetermined vehicle speed, the seventh processing section 167 decreases the absolute value of the threshold value Tc stored in the fourth storage section 124.

Hereinafter, the processing of the controller 100 for this remaining liquid amount meter 200 will be described with reference to the flowcharts shown in FIGS. 3 and 4.

This controller 100 is initiated when the main switch of the vehicle is turned ON (Step S1). Upon initiation of the control, the liquid surface level in the tank is detected by the first detection section 141, and the average value RT of the levels is computed (Steps S2, S3). In this embodiment, the evaluation of the detected value showing the liquid surface level in the tank is performed based on the average value of two detected values obtained by excluding the maximum value and the minimum value from four successive detected values. The controller 100 stores the successive four detected values $R(n)$, $R(n-1)$, $R(n-2)$, and $R(n-3)$ in the order of detection (Step S2). Then, the maximum value and the minimum value are excluded from four successive detected values $R(n)$, $R(n-1)$, $R(n-2)$, and $R(n-3)$, and the average value RT of two remaining detected values is computed (Step S3).

Next, the display level Rm is obtained from the average value RT (Step S4). In this case, it is preferable that the first processing section 161 specifies a display level suitably indicating the remaining amount of liquid in the tank, among the plurality of display levels stepwisely indicating the remaining amount of liquid in the tank stored in the first storage section 121, based on the average value RT computed at Step S3. In this manner, employing the average value RT as the detected value of the liquid surface level in the tank allows rather correct detection of the remaining amount of liquid even if the liquid surface level fluctuates in the tank. At this stage, the remaining liquid amount meter 200 is controlled such that the display portion 210 of the remaining liquid amount meter 200 displays the remaining amount of fuel in accordance with the display level Rm.

Next, the cumulative value T is set to an initial value (Step S5). In this embodiment, the initial value is 0 (zero), and hence the cumulative value T stored in the third storage section 123 is set to 0 (that is, T=0).

Next, in this embodiment, the threshold value Tc stored in the fourth storage section 124 is changed in accordance with the vehicle speed V detected by the second detection section 142 (Steps S6 to S8). This processing is performed by the seventh processing section 167. In this embodiment, when the vehicle speed V is lower than a predetermined vehicle speed, the threshold value Tc is decreased in terms of the absolute value. Specifically, in this embodiment, it is determined whether or not the vehicle speed V is 5 km/h or more (Step S6). When the vehicle speed V is 5 km/h or more (YES at Step S6), the threshold value Tc stored in the fourth storage section 124 is set to 600 (Tc=600) (Step S7). When the vehicle speed V is lower than 5 km/h (NO at Step S6), the threshold value Tc stored in the fourth storage section 124 is set to 40 (Tc=40) (Step S8).

Next, the liquid surface level in the tank is newly detected by the first detection section 141 (Step S9), and an average value RT is newly computed (Step S10). In this embodiment, the values of $R(n-3)$, $R(n-2)$, and $R(n-1)$ are set to the detected values stored in $R(n-2)$, $R(n-1)$, and $R(n)$ in this order by the following equations:

$R(n-3)=R(n-2)$, $R(n-2)=R(n-1)$, and $R(n-1)=R(n)$

Then, the detected value of the liquid surface level in the tank newly detected by the first detection section 141 is set to $R(n)$. An average value RT is computed from four detected values $R(n)$, $R(n-1)$, $R(n-2)$, and $R(n-3)$, which are rewritten in this manner. In this embodiment, the maximum value and the minimum value are excluded from the values $R(n)$, $R(n-1)$, $R(n-2)$, and $R(n-3)$, and an average value RT of two remaining detected values is computed.

Next, the display level Rm1 is obtained from the average value RT newly computed at Step S10 (Step S11). In this case, it is preferable that the display level suitably indicating the remaining amount of liquid in the tank is specified based on the average value RT computed at Step S10 among the plural display levels stepwisely indicating the remaining amount of liquid in the tank stored in the first storage section 121.

Next, it is determined whether or not the display level Rm1 obtained at Step S11 coincides with the display level Rm currently displayed by the remaining liquid amount meter 200 (Step S12). When it is determined at Step S12 that the display level Rm1 coincides with the current display level Rm (NO at S12), the routine returns to the aforementioned processing S6. When it is determined that the display level (Rm1) does not coincide with the current display level Rm (YES at S12), it is determined whether or not the display level Rm1 is lower than the current display level Rm (Step S13).

When it is determined at Step S13 that the display level Rm1 is lower than the current display level Rm (YES at Step S13), the cumulative value T is decreased (Step S14). At this time, in this embodiment, the cumulative value T is set to T−1 (T=T−1), that is, the cumulative value T stored in the third storage section 123 is set to a value (T−1) obtained by subtracting 1 from the current cumulative value T. The controller 100 performs the processing S14 by the second processing section 162.

Moreover, when it is determined at Step S13 that the display level Rm1 is higher than the current display level Rm (NO at Step S13), the cumulative value T is increased (Step S15). At this time, in this embodiment, the cumulative T is set to T+1 (T=T+1), that is, the cumulative value T stored in the third storage section 123 is set to a value (T+1) obtained by adding 1 to the current cumulative value T. The controller 100 performs the processing S15 by the third processing section 163.

Next, when the cumulative value T becomes smaller than the threshold value Tc, the display level is decreased, whereas when the cumulative value T becomes larger than the threshold value Tc, the display level is increased (Steps S16 to S19).

That is, in this embodiment, the cumulative value T is evaluated by the absolute value. First, it is determined whether or not the absolute value |T| of the cumulative value T becomes larger than the threshold value Tc (Step S16). When it is determined at Step S16 that the absolute value |T| of the cumulative value T is not larger than the threshold value (Tc) (NO at Step S16), the routine returns to the aforementioned processing of Step S6.

When it is determined at Step S16 that the absolute value |T| of the cumulative value T is not less than the threshold value Tc (YES at Step S16), it is further determined whether the cumulative value T is positive or negative (Step S17).

When it is determined at Step S17 that T<0 (zero), that is, the cumulative value T is a negative number, the display level Rm is decreased (Step S18). In this embodiment, the display level Rm is decreased by 1 (Rm=Rm−1). The controller 100 performs the processing S18 by the fourth processing section 164.

Moreover, when it is determined at Step S17 that it is not T<0 (zero), that is, the cumulative value T is a positive number, the display level Rm is increased (Step S19). In this embodiment, the display level Rm is increased by 1 (Rm=Rm+1). The controller 100 performs the processing S19 by the fifth processing section 165.

Figure 5:
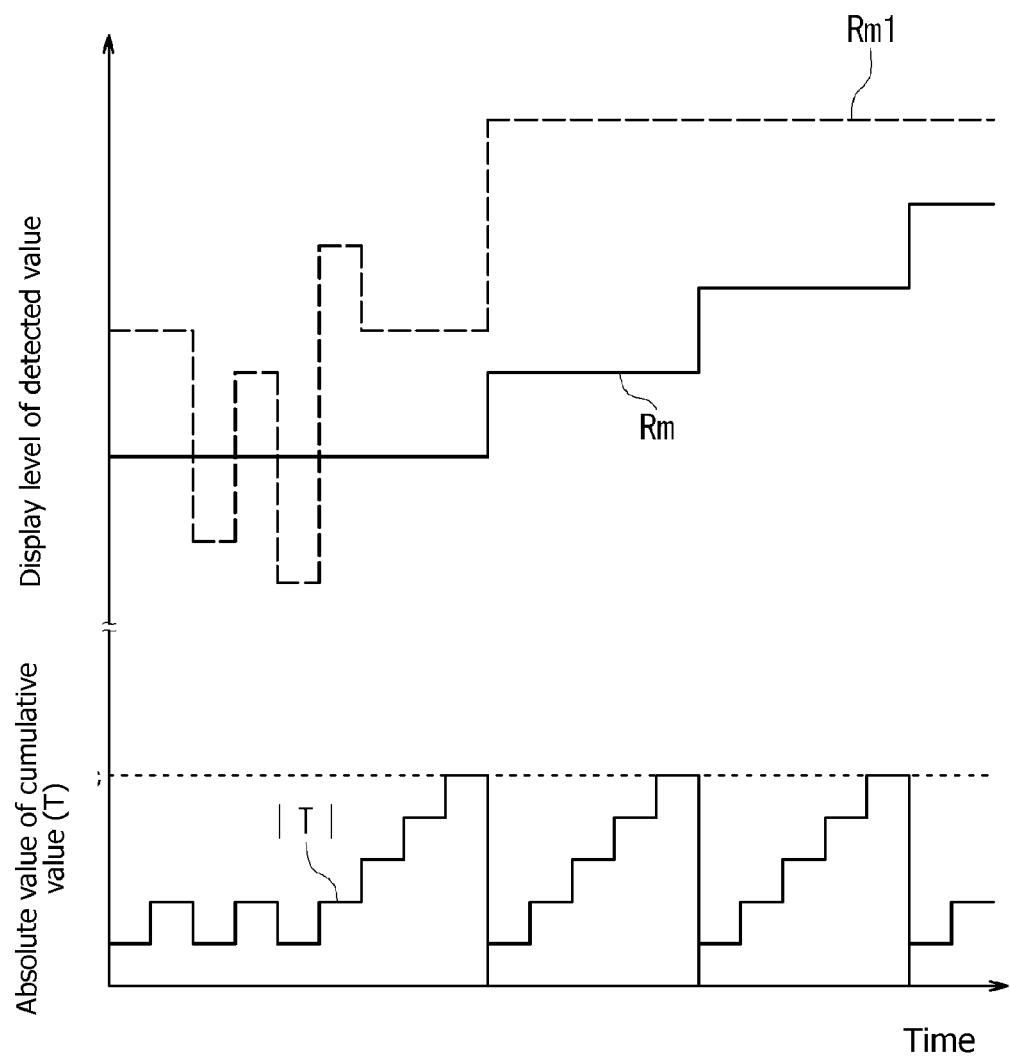
FIG. 5 is a graph showing a change in a display level (Rm) according to the embodiment of the invention.

That is, in this remaining liquid amount meter 200, even in cases where the display level Rm1 based on the detected value changes frequently as shown in FIG. 5, the display level Rm does not follow the changes of the display level Rm1 correspondingly, but follows the changes of the display level Rm when the display level Rm1 based on the detected value has been continuously changed to some extent.

Then, after completion of the processing at Step S18 or S19, the cumulative value T is returned to the initial value 0 (zero) (Step S20), and then the routine returns to the aforementioned processing S6. The cumulative value T is reset to the initial value 0, and the processing of Steps S6 to S20 are repeatedly performed. Here, although not shown in the drawings, a determination processing section can be provided so that the routine leaves from the loop of Steps S6 to S20 when the main switch is turned off. In this embodiment, the processing of Steps S6 to S20 are performed at specified time intervals (for example, every 50 ms).

The controller 100 of this remaining liquid amount meter 200 performs the cumulative processing that increases the cumulative value T when the display level Rm1 obtained based on the fluid level detected by the first detection section 141 is higher than the display level Rm currently displayed by the remaining liquid amount meter 200 and that decreases the cumulative value T when the display level Rm1 is lower than the current display level Rm (Steps S9 to S15). Then, when the cumulative value T exceeds the predetermined threshold value Tc, the controller 100 performs the display processing for changing the display level Rm currently displayed by the remaining liquid amount meter 200 (Steps S16 to S19).

According to the controller 100 of the remaining liquid amount meter 200, as shown in FIGS. 3 and 4, the cumulative value T is changed by the cumulative processing (Steps S9 to S15). When the state in which it is determined that the fuel is decreased based on the detection of the first detection section 141 has continued for a certain period of time or the state in which it is determined that the fuel is increased has continued for a certain period of time, the cumulative value T exceeds the threshold value Tc. Then, the display level Rm currently displayed by the remaining liquid amount meter 200 is changed based on the fact that the cumulative value T exceeds the threshold value Tc by the display processing S16 to S19. In this manner, in the controller 100 of this remaining liquid amount meter 200, the cumulative value T is used in the processing for changing the display of the remaining liquid amount meter 200, and when the value detected by the first detection section 141 has been continuously changed for a certain period of time, the display of the remaining liquid amount meter 200 is changed. This prevents display flickering of the remaining liquid amount meter 200, resulting in more accurate display of the remaining amount of liquid.

In this embodiment, in cases where the vehicle speed V is lower than the predetermined vehicle speed (5 km/h in this embodiment), the threshold value Tc is set to be small. This allows quick display changes of the remaining liquid amount meter 200 to such a degree that no flickering display of the remaining liquid amount meter 200 occurs. For example, when a vehicle is raised upright from an inclined state, the display level Rm of the remaining liquid amount meter 200 is changed quickly to an extent that no flickering display of the remaining liquid amount meter 200 occurs, and the display level corresponding to the liquid surface level in a state where the vehicle is stood upright is displayed at an early stage by the remaining liquid amount meter 200. Further, in this embodiment, in cases where the vehicle speed V is higher than 5 km/h, the threshold value Tc is set to be large. Thus, when the vehicle speed V is high to a certain extent, even if the liquid surface in the tank is waved by the vehicle's vibration, the display level Rm of the remaining liquid amount meter 200 can be made stable. By setting the threshold value Tc based on the vehicle speed as mentioned above, a suitable display can be properly provided to the driver.

Further, in this embodiment, in the cumulative processing (S9 to S15), the display level Rm1 is specified based on the average value RT of the liquid surface levels detected by the first detection section 141. By specifying the display level Rm1 based on the average value RT of the liquid surface levels detected by the first detection section 141 in this manner, even if the liquid surface in the tank is waved due to the vehicle's vibration, a more correct display level Rm1 can be computed. This allows the remaining liquid amount meter 200 to display a more accurate value. In this embodiment, in the display processing (S16 to S19), the display level is changed one by one, causing gradual display changes of the remaining liquid amount meter 200, which prevents occurring of display flickering.

Although the controller of the remaining liquid amount meter according to one embodiment of the present invention was described above, the controller of the remaining liquid amount meter according to the present invention is not limited to the embodiment described above.

In the aforementioned embodiment, a meter for displaying the remaining amount of fuel was exemplified as an example of the remaining liquid amount meter of the present invention. However, the remaining liquid amount meter according to the present invention is not limited to a meter for displaying the remaining amount of fuel, but can be employed as a remaining liquid amount meter configured to display the remaining amount of various kinds of liquid, such as, e.g., lubrication oil, engine oil, in a tank of a vehicle.

Moreover, in the controller of the remaining liquid amount meter, the cumulative processing is executed such that when the display level Rm1 specified based on the liquid surface level detected by the detection section is higher than the display level Rm currently displayed by the remaining liquid amount meter, the cumulative value T is increased, and such that when the display level Rm1 is lower than the display level Rm, the cumulative value T is decreased. Then, when the cumulative value T exceeds the predetermined threshold Tc, the display processing of changing the display level Rm currently displayed by the remaining liquid amount meter 200 is performed. The specific system construction of the controller for performing the cumulative processing and display processing is not limited to the embodiment described above.

Further, in the aforementioned embodiment, it is configured such that the threshold Tc is changed based on the vehicle speed V, but the present invention does not always require changing of the threshold Tc based on the vehicle speed V. For example, when the property of the target liquid to be displayed by the remaining liquid amount meter, the liquid surface level, and/or the degree of vehicle's vibration are not changed in accordance with the vehicle speed V, it can be configured so as not to change the threshold Tc based on the vehicle speed V. Furthermore, as for how to set the threshold value Tc according to the vehicle speed V or what value is set for the threshold value Tc, various modifications can be made. In the aforementioned embodiment, the threshold value Tc is changed in the determination processing at Step S6 based on whether or not the vehicle speed V is 5 km/h or more, but the way of setting the threshold value Tc is not limited to this. For example, different threshold values Tc can be set for plural vehicle speed ranges. Specifically, different threshold values Tc can be set depending on the vehicle speed V of not more than 5 km/h, the vehicle speed V of more than 5 km/h but less than 30 km/h, and the vehicle speed V of not less than 30 km/h.

Furthermore, the evaluation of the cumulative value T with respect to the display level Rm can be opposite to that in the aforementioned embodiment. Similarly, the evaluation of the display level Rm with respect to the cumulative value T can be also opposite to that in the aforementioned embodiment. That is, in the aforementioned embodiment, when the fuel is decreased, the cumulative value T becomes a negative value and is gradually decreased into a smaller value. To the contrary, it can be configured such that when the fuel is decreased, the cumulative value T becomes a positive value and is gradually increased into a larger value. Moreover, in the aforementioned embodiment, the cumulative value T is evaluated in terms of the absolute value, but the cumulative value T to be displayed as an integer can be a positive value and a negative value, respectively. In this case, different threshold values Tc can be set for the case where the liquid increases and for the case where the liquid decreases. With this, for example, the timing of updating can be changed for the case where the liquid increases and for the case where the liquid decreases. In this case, in the aforementioned embodiment, for example, it can be configured such that the fourth storage section 124 stores different threshold values as the threshold value Tc of the fourth processing section 164 and as the threshold value Tc of the fifth processing section 165. Furthermore, how the cumulative value T is changed and how the display level Rm is changed can be also made differently for the case where the liquid increases and for the case where the liquid decreases.

Furthermore, in the aforementioned embodiment, the display level Rm is specified based on the average value of the liquid surface levels detected plural times by the detection section. However, the way of obtaining the average value is not limited to the aforementioned embodiment. As described in the embodiment, an average value can be obtained by averaging detected values of the liquid surface levels detected several times from which the maximum value and the minimum value are excluded. Furthermore, an average value can be obtained without excluding the maximum value and the minimum value from the detected values of the liquid surface levels detected plural times.

Various embodiments and modified embodiments of the controller for the remaining liquid amount meter according to the present invention have been described as examples. It should be understood that, however, these embodiments merely show examples of the remaining liquid amount meter of the present invention, and the present invention is not limited to the embodiments described above.

Although the aforementioned embodiment is directed to a meter for indicating the remaining fuel amount for a two-wheeled vehicle configured to be parked using a side stand. It should be understood, however, that the present invention can also be applied to a meter for indicating the remaining liquid amount for various types of vehicles. In other words, the language "vehicle" is to be construed broadly and encompasses various motorized vehicles that are ridden by one or more rider, including, e.g., motorbikes, scooters, mopeds and other similar vehicles, which can include two wheeled vehicles and vehicles having more than two wheels.

In this application, the language "vehicle" includes, for example, motorcycles, snow mobiles, all terrain vehicles (ATVs), four-wheeled buggies, etc., which often involve vehicles that can be turned, tilted or otherwise affected by the driver's weight position.

It also should be noted that the present invention can be preferably applied to a measuring apparatus for use in straddle type vehicles. In this regards, the terminology straddle type vehicle is not limited to vehicles in which a driver and/or passenger sits with legs straddling on opposite sides of a portion of the vehicle (such as, e.g., straddling a seat), but also includes vehicles in which a driver and/or passenger's legs can extend across a substantial portion of the width of the passenger-supporting portion of the vehicle, such that, by way of example, while a driver may sit with legs forward in a scooter, a scooter is understood to be a straddle type vehicle due to the ability of a driver and/or passenger to extend their legs across a substantial portion of the width of the passenger-supporting portion. In this manner, the driver of a straddle type vehicle is typically able to distribute their weight widthwise across the vehicle and to turn, tilt or otherwise influence the vehicle by the driver's weight position.

Broad Scope of the Invention

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A controller for a remaining liquid amount meter configured to display a remaining amount of liquid in a tank of a vehicle, the controller comprising:
    a detection section for detecting a liquid surface level in the tank; and
    a storage section for storing a plurality of display levels indicating the remaining amount of liquid in the tank of the vehicle and a cumulative value used to measure a timing of updating a current display level (Rm) displayed by the remaining liquid amount meter,
    wherein the controller is configured to perform:
    cumulative processing for increasing the cumulative value when a specified display level (Rm1) based on the liquid surface level detected by the detection section is higher than the current display level (Rm) displayed by the remaining liquid amount meter and for decreasing the cumulative value when the specified display level (Rm1) is lower than the current display level (Rm);
    display processing for changing the current display level (Rm) displayed by the remaining liquid amount meter when the cumulative value exceeds a predetermined threshold value; and
    the specified display level (Rm1) is specified based on an average value of the liquid surface levels detected a plurality of times by the detection section.

2. The controller for a remaining liquid amount meter as recited in claim 1,
    wherein the threshold value differs based on a vehicle speed.

3. The controller for a remaining liquid amount meter as recited in claim 1,
    wherein the current display level (Rm) is changed in the display processing.

4. A controller for a remaining liquid amount meter configured to display a remaining amount of liquid in a tank of a vehicle, the controller comprising:
    a first storage section for storing a plurality of display levels indicating the remaining amount of liquid in the tank of the vehicle;
    a second storage section for storing a first display level (Rm) to be displayed by the remaining liquid amount meter among the plurality of display levels;
    a third storage section for storing a cumulative value used to measure a timing of updating the first display level (Rm) displayed by the remaining liquid amount meter;
    a fourth storage section for storing a threshold value for determining the timing of updating the first display level (Rm) stored in the second storage section;
    a first detection section for detecting a liquid surface level in the tank;
    a first processing section for specifying a second display level (Rm1) from the plurality of display levels stored in the first storage section based on the liquid surface level detected by the first detection section;
    a second processing section for decreasing the cumulative value stored in the third storage section when the second display level (Rm1) specified by the first processing section is less than the first display level (Rm) stored in the second storage section;
    a third processing section for increasing the cumulative value stored in the second storage section when the second display level (Rm1) specified by the first processing section is greater than the first display level (Rm) stored in the second storage section;
    a fourth processing section for decreasing the first display level (Rm) stored in the second storage section when the cumulative value stored in the third storage section is less than the threshold value stored in the fourth storage section;
    a fifth processing section for increasing the first display level (Rm) stored in the second storage section when the cumulative value stored in the third storage section is greater than the threshold value stored in the fourth storage section; and
    a sixth processing section for setting the cumulative value stored in the third storage section to a predetermined initial value after the processing result of the fourth processing section or the fifth processing section; wherein
    the first processing section specifies the second display level (Rm1) based on an average value of the liquid surface levels detected plural times by the first detection section.

5. The controller for a remaining liquid amount meter as recited in claim 4, further comprising:
    a second detection section for detecting a vehicle speed of the vehicle; and
    a seventh processing section for changing the threshold value stored in the fourth storage section based on the vehicle speed detected by the second detection section.

6. The controller for a remaining liquid amount meter as recited in claim 5,
    wherein the seventh processing section decreases an absolute value of the threshold value stored in the fourth storage section when the vehicle speed detected by the second detection section is less than a predetermined vehicle speed.

7. The controller for a remaining liquid amount meter as recited in claim 4,
    wherein the fourth storage section stores different threshold values including a threshold value for the fourth processing section and a threshold value for the fifth processing section.

8. The controller for a remaining liquid amount meter as recited in claim 4,
    wherein the fourth processing section decreases the first display level (Rm) stored in the second storage section when the cumulative value stored in the third storage section is less than the threshold value stored in the fourth storage section.

9. The controller for a remaining liquid amount meter as recited in claim 4,
wherein the fifth processing section increases the first display level (Rm) stored in the second storage section when the cumulative value stored in the third storage section is greater than the threshold value stored in the fourth storage section.

10. A remaining liquid amount meter controlled in display of a remaining amount of liquid in a tank by a controller,
the controller comprising:
a detection section for detecting a liquid surface level in the tank; and
a storage section for storing a plurality of display levels indicating the remaining amount of liquid in the tank of the vehicle and a cumulative value used to measure a timing of updating a current display level (Rm) displayed by the remaining liquid amount meter,
wherein the controller is configured to perform:
cumulative processing for increasing the cumulative value when a specified display level (Rm1) based on the liquid surface level detected by the detection section is higher than the current display level (Rm) currently displayed by the remaining liquid amount meter and for decreasing the cumulative value when the specified display level (Rm1) is less than the current display level (Rm);
display processing for changing the current display level (Rm) currently displayed by the remaining liquid amount meter when the cumulative value exceeds a predetermined threshold value; and
the specified display level (Rm1) is specified based on an average value of the liquid surface levels detected plural times by the detection section.

11. The remaining liquid amount meter as recited in claim 10,
wherein the threshold value differs based on a vehicle speed.

12. The remaining liquid amount meter as recited in claim 10,
wherein the current display level (Rm) is changed in the display processing.

13. A vehicle equipped with a remaining liquid amount meter controlled by a controller,
the controller comprising:
a detection section for detecting a liquid surface level in the tank; and
a storage section for storing a plurality of display levels indicating the remaining amount of liquid in the tank of the vehicle and a cumulative value used to measure a timing of updating a current display level (Rm) displayed by the remaining liquid amount meter,
wherein the controller is configured to perform:
cumulative processing for increasing the cumulative value when a specified display level (Rm1) based on the liquid surface level detected by the detection section is higher than the current display level (Rm) currently displayed by the remaining liquid amount meter and for decreasing the cumulative value when the specified display level (Rm1) is lower than the current display level (Rm);
display processing for changing the current display level (Rm) currently displayed by the remaining liquid amount meter when the cumulative value exceeds a predetermined threshold value; and
the specified display level (Rm1) is specified based on an average value of the liquid surface levels detected a plurality of times by the detection section.

14. A method for controlling a remaining liquid amount meter configured to display a remaining amount of liquid in a tank of a vehicle, the method comprising:
using a controller to perform the steps of:
determining a plurality of display levels indicating the remaining amount of liquid in the tank of the vehicle;
determining a first display level (Rm) to be displayed by the remaining liquid amount meter among the plurality of display levels;
determining a cumulative value used to measure a timing of updating the first display level (Rm) displayed by the remaining liquid amount meter;
storing a threshold value for determining the timing of updating the first display level (Rm);
detecting a liquid surface level in the tank;
specifying a second display level (Rm1) from the plurality of display levels based on the liquid surface level detected by the detecting step;
decreasing the cumulative value when the second display level (Rm1) is less than the first display level (Rm);
increasing the cumulative value when the second display level (Rm1) is greater than the first display level (Rm);
decreasing the first display level (Rm) when the cumulative value is less than the threshold value;
increasing the first display level (Rm) when the cumulative value is greater than the threshold value; and
setting the cumulative value to a predetermined initial value after processing a result of the step of decreasing the first display level (Rm) or a result of the step of increasing the first display level (Rm); wherein
the second display level (Rm1) is specified based on an average value of the liquid surface levels detected a plurality of times in the step of detecting the liquid surface level in the tank.

* * * * *